(12) United States Patent
Han

(10) Patent No.: US 8,831,347 B2
(45) Date of Patent: Sep. 9, 2014

(54) DATA SEGMENTING APPARATUS AND METHOD

(75) Inventor: Bo Han, Beijing (CN)

(73) Assignee: Sony Corporation, Tokyo (JP)

( * ) Notice: Subject to any disclaimer, the term of this patent is extended or adjusted under 35 U.S.C. 154(b) by 260 days.

(21) Appl. No.: 13/342,464

(22) Filed: Jan. 3, 2012

(65) Prior Publication Data

US 2012/0183219 A1 Jul. 19, 2012

(30) Foreign Application Priority Data

Jan. 13, 2011 (CN) .......................... 2011 1 0023919

(51) Int. Cl.
*G06K 9/34* (2006.01)
*G06K 9/00* (2006.01)
*G06K 9/68* (2006.01)
*H04N 5/14* (2006.01)
*H04N 9/64* (2006.01)

(52) U.S. Cl.
USPC ........... 382/173; 382/164; 382/219; 382/220; 348/700

(58) Field of Classification Search
USPC .......................................... 382/173; 348/700
See application file for complete search history.

(56) References Cited

U.S. PATENT DOCUMENTS

| 6,710,822 | B1 * | 3/2004 | Walker et al. ................. | 348/722 |
| 6,738,100 | B2 * | 5/2004 | Hampapur et al. ........... | 348/702 |
| 8,195,038 | B2 * | 6/2012 | Liu et al. ....................... | 386/344 |
| 8,254,677 | B2 * | 8/2012 | Abe et al. ...................... | 382/170 |
| 8,363,960 | B2 * | 1/2013 | Petersohn ..................... | 382/225 |
| 2001/0021268 | A1 * | 9/2001 | Jun et al. ....................... | 382/165 |
| 2007/0201746 | A1 * | 8/2007 | Kim .............................. | 382/190 |
| 2010/0259688 | A1 * | 10/2010 | Zoetekouw et al. .......... | 348/700 |
| 2013/0194508 | A1 * | 8/2013 | PB et al. ....................... | 348/700 |

* cited by examiner

*Primary Examiner* — Matthew Bella
*Assistant Examiner* — Jose M Torres
(74) *Attorney, Agent, or Firm* — Oblon, Spivak, McClelland, Maier & Neustadt, L.L.P.

(57) ABSTRACT

Data segmenting apparatus and method are provided. An apparatus for segmenting an input data sequence includes: a boundary searching device configured to search for one or more candidate boundaries in the data sequence, to obtain one or more candidate segmenting schemes formed by different combinations of these candidate boundaries; and an evaluating device configured to generate, for each candidate segmenting scheme, an evaluation value of each candidate boundary in the scheme by evaluating a segmenting loss caused by using the candidate boundary to segment the data sequence, and determine whether the candidate boundary is valid in the candidate segmenting scheme according to the evaluation value reflecting association relationship between a pair of adjacent data segments adjoining to the candidate boundary and association relationship between each of one or more pairs of non-adjacent data segments, each of which includes two non-adjacent data segments located at two sides of the candidate boundary.

18 Claims, 9 Drawing Sheets

DATA SEGMENTING APPARATUS AND METHOD

FIELD

The disclosure relates to the processing and analysis of electronic device data, and particularly, to an apparatus and method of segmenting an input data sequence automatically.

BACKGROUND

In the processing and analysis of electronic device data, how to segment the data automatically is a subject attracted much concern. The result of data segmentation may directly effects the result of subsequent data processing. For example, in the case of video summarization and browsing, segmenting the video data is a fundamental step. If the video data is not segmented appropriately, the resultant video content summarization may be inaccurate and the efficiency of the browsing may be lowered.

SUMMARY

The following presents a simplified summary of the disclosure in order to provide a basic understanding of some aspects of the disclosure. This summary is not an exhaustive overview of the disclosure. It is not intended to identify key or critical elements of the disclosure or to delineate the scope of the disclosure. Its sole purpose is to present some concepts in a simplified form as a prelude to the more detailed description that is discussed later.

According to an aspect of the disclosure, an apparatus for segmenting an input data sequence is provided. The apparatus for segmenting an input data sequence may include: a boundary searching device configured to search for one or more candidate boundaries in the input data sequence, in order to obtain one or more candidate segmenting schemes formed by different combinations of these candidate boundaries; and an evaluating device configured to, with respect to each candidate segmenting scheme, generate an evaluation value of each candidate boundary in the candidate segmenting scheme, by evaluating a segmenting loss caused by using the candidate boundary in the candidate segmenting scheme to segment the input data sequence, and determine whether the candidate boundary is valid in the candidate segmenting scheme according to the evaluation value, the evaluation value reflecting association relationship between a pair of adjacent data segments adjoining to the candidate boundary and association relationship between each of one or more pairs of non-adjacent data segments, each pair of non-adjacent data segments comprising two non-adjacent data segments respectively located at two sides of the candidate boundary.

According to an aspect of the disclosure, a method for segmenting an input data sequence is provided. The method may include: searching for one or more candidate boundaries in the input data sequence, in order to obtain one or more candidate segmenting schemes formed by different combinations of these candidate boundaries, generating, with respect to each candidate segmenting scheme, an evaluation value of each candidate boundary in the candidate segmenting scheme by evaluating a segmenting loss caused by using the candidate boundary in the candidate segmenting scheme to segment the input data sequence, and determining whether the candidate boundary is valid in the candidate segmenting scheme according to the evaluation value the evaluation value reflecting association relationship between a pair of data adjacent segments adjoining to the candidate boundary and association relationship between each of one or more pairs of non-adjacent data segments, each pair of non-adjacent data segments comprising two non-adjacent data segments respectively located at two sides of the candidate boundary.

According to another aspect of the disclosure, a computer implemented data segmenting apparatus is provided. The computer implemented data segmenting apparatus may include: an input device configured to receive an input data sequence; and a processing device coupled to the input device. The processing device may include: a boundary searching device configured to search for one or more candidate boundaries in the input data sequence, in order to obtain one or more candidate segmenting schemes formed by different combinations of these candidate boundaries; and an evaluating device configured to, with respect to each candidate segmenting schemes, generate an evaluation value of each candidate boundary in the candidate segmenting scheme by evaluating a segmenting loss caused by using the candidate boundary in the candidate segmenting scheme to segment the input data sequence, and determine whether the candidate boundary is valid in the candidate segmenting scheme according to the evaluation value, the evaluation value reflecting association relationship between a pair of adjacent data segments adjoining to the candidate boundary and association relationship between each of one or more pairs of non-adjacent data segments, each pair of non-adjacent data segments comprising two non-adjacent data segments respectively located at two sides of the candidate boundary.

In addition, some embodiments of the disclosure further provide computer program for realizing the above method.

Further, some embodiments of the disclosure further provide computer program products in at least the form of computer-readable medium, upon which computer program codes for realizing the above method are recorded.

BRIEF DESCRIPTION OF DRAWINGS

The above and other objects, features and advantages of the embodiments of the disclosure can be better understood with reference to the description given below in conjunction with the accompanying drawings, throughout which identical or like components are denoted by identical or like reference signs. In addition the components shown in the drawings are merely to illustrate the principle of the disclosure. In the drawings.

DETAILED DESCRIPTION

Some embodiments of the present disclosure will be described in conjunction with the accompanying drawings hereinafter. It should be noted that the elements and/or features shown in a drawing or disclosed in an embodiments may be combined with the elements and/or features shown in one or more other drawing or embodiments. It should be further noted that some details regarding some components and/or processes irrelevant to the disclosure or well known in the art are omitted for the sake of clarity and conciseness.

Some embodiments of the disclosure provide apparatuses and methods for segmenting an input data sequence. In the disclosure the so called data sequence refers to a sequence including one or more data segments arranged in a temporal and/or spatial order. The data sequence may be a scalar quantity sequence, a vector quantity sequence, text, audio, images or video (motion pictures), or any combination thereof. For the concise of description, in some embodiments and/or examples below, video data is taken as an example of the data sequence. It should be noted the examples are merely illustrative and the data sequence of the disclosure should not be regarded as being limited to these.

Figure 1:
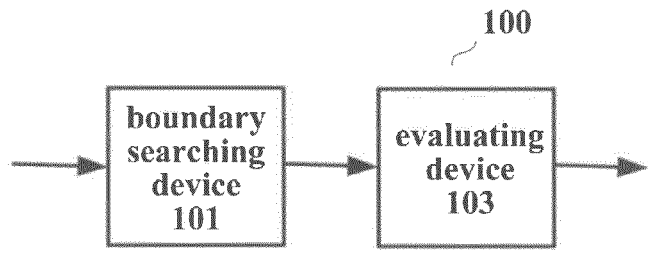
FIG. 1 is a schematic block diagram illustrating the structure of a data segmenting apparatus according to an embodiment.
Figure 2:
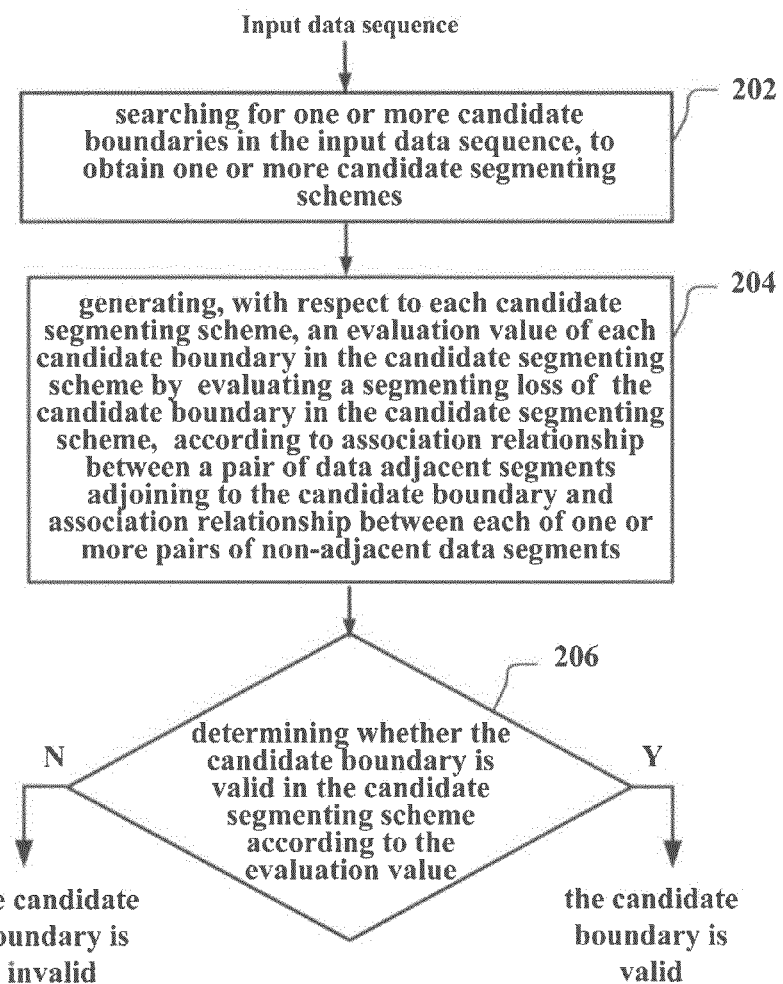
FIG. 2 is a schematic flow chart illustrating a data segmenting method according to the embodiment.

FIG. 1 is a schematic block diagram illustrating the structure of a data segmenting apparatus according to an embodiment, and FIG. 2 is a schematic flow chart illustrating a data segmenting method according to the embodiment. In the embodiment, the candidate boundaries of the data sequence are searched first. Then the candidate boundaries are evaluated. In the evaluation, not only the association relationship between a pair of adjacent data segments adjoining to the candidate boundary, but also the association relationships between one or more pairs of non-adjacent data segments are considered.

As shown in FIG. 1, data segmenting apparatus 100 may include a boundary searching device 101 and an evaluating device 103. The data segmenting apparatus 100 may utilize the method as shown in FIG. 2. The functions of the devices in the data segmenting apparatus 100 are described below with reference to the method flow shown in FIG. 2.

The boundary searching device 101 is configured to search for one or more candidate boundaries in the input data sequence (step 202). The different combination of the candidate boundaries obtained by the boundary searching device 101 may form various different candidate segmenting schemes.

The boundary searching device 101 may search the candidate boundaries by utilizing any appropriate method, for example, the boundary searching device 101 may utilize a traversal method, an equal-interval sampling method or a pre-segmenting method using sliding window (only the positions in the former half and latter half that have apparent differences therebetween are selected) or other methods to search the candidate boundaries, which are not enumerated and detailed herein. As a particular example, in the case that the input data sequence is video data, the boundaries between the shots (each shot may include one or more image frames) may be used (e.g. by the boundary searching device 101) as the candidate segmenting points, i.e. candidate boundaries. In the case that the input data sequence is audio data, each silence position or break in the audio may be used as candidate boundaries. In the case that the input data sequence is text, the positions in which some special characters (such as a full stop, a new symbol, or a page break, etc.) appear may be used as candidate boundaries.

Figure 3:
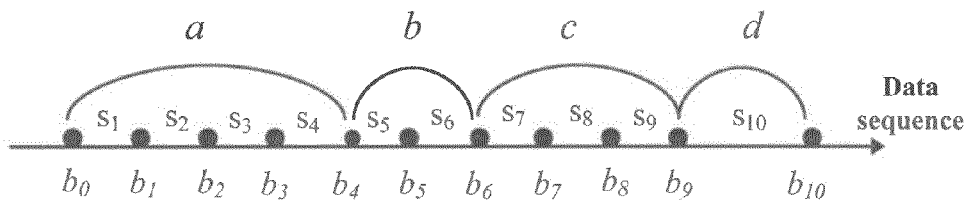
FIG. 3 is a schematic diagram illustrating an example a data sequence.

FIG. 3 shows an example of data sequence. In the example of FIG. 3, the whole data sequence contains n data units $s_1$, $s_2, \ldots, s_n$, wherein n represents the number of the data units in the data sequence, and in this example, n=10. As shown, $b_0$, $b_1, b_2, \ldots, b_n$ represent the boundaries between the data units. It is assumed that after the searching in step 202, the boundary searching device 101 utilizes $b_4$, $b_6$, $b_9$ as the candidate boundaries. In addition, $b_0$ and $b_{10}$ are the start and end points of the data sequence, respectively, and should be included in each candidate segmenting scheme. The different combinations of these candidate boundaries and the start and end points ($b_0$, $b_4$, $b_6$, $b_9$, $b_{10}$) may form a plurality of candidate segmenting schemes different from each other. To simplify the description, FIG. 3 shows only a candidate segmenting scheme including all the candidate boundaries ($b_0$, $b_4$, $b_6$, $b_9$, $b_{10}$). As shown, the candidate segmenting scheme divides the data sequence into four data segments a, b, c, d. Each of the data segment may include at least one data unit. In an example that the data sequence is video data, a data unit $s_i$ ($1 \leq i \leq n$) may include one shot (each shot may include one or more image frames); and a data segment may be a scene including a plurality of contiguous shots. Taking the candidate segmenting scheme including all the candidate boundaries ($b_0$, $b_4$, $b_6$, $b_9$, $b_{10}$) shown in FIG. 3 as an example, data segment a includes data units $s_1$, $s_2$, $s_3$, $s_4$; data segment b includes data units $s_5$, $s_6$; data segment c includes data units $s_7$, $s_8$, $s_9$; and data segment d includes a data unit $s_{10}$.

The boundary searching device 101 sends the search result to the evaluating device 103. The evaluating device 103 is configured to calculate the evaluation value of a candidate boundary in a candidate segmenting scheme (step 204). Particularly, for a candidate boundary in a candidate segmenting scheme, the evaluating device 103 evaluates the segment loss resulted from segmenting the data sequence by using the candidate boundary according to the association relationship between a pair of adjacent data segments adjoining to the candidate boundary and the association relationship between each pair of one or more pairs of non-adjacent data segments, as the evaluation value of the candidate boundary. That is, the evaluation value of a candidate boundary reflects the association relationship between a pair of adjacent data segments adjoining to the candidate boundary and the association relationship between each pair of one or more pairs of non-adjacent data segments. The so called a pair of non-adjacent data segments refers to two data segments that are located at the two sides of the candidate boundary, respectively, and are not adjacent to each other. The association relationship between two data segments may be a feature value representing the similarity of the two data segments in one or more features. The feature may be any feature that characterizes one or more characteristics of the data sequence, and is not limited to any example herein. In an example in which the input data sequence is video, the feature may be color, texture and/or content, etc. In an example in which the input data sequence is text, the feature may be keyword and/or content, etc. In an example in which the input data sequence is audio data, the feature may be spectrum and/or content, etc. Any appropriate feature may be selected according to the actual application scenario, and the disclosure should not be limited to the examples.

As an example, supposing a candidate boundary $\Delta$ in a candidate segmenting scheme is evaluated, the evaluation value (i.e. the segmenting loss resulted from data segmentation by use of this boundary) obtained by the evaluating device 103 according to the embodiment may be represented by the following formula:

$$E(\Delta) = \sum_{\alpha \to \Delta \to \beta} F[A(\alpha, \beta), A(\alpha, \alpha), A(\beta, \beta)] \quad (1)$$

Or, the evaluation value in the above formula may be defined as follows:

$$E(\Delta) = \sum_{\alpha \to \Delta \to \beta} F[A(\alpha, \beta), A(\alpha, \alpha \cup \beta), A(\beta, \alpha \cup \beta)] \quad (1a)$$

In the above formulas (1) and (1a), $E(\Delta)$ represents the loss function (i.e. the evaluation of the boundary) of segmenting the data sequence at the candidate boundary $\Delta$; $\alpha \to \Delta \to \beta$ represents two data segments preceding and following the boundary $\Delta$ in an arrangement order of data in the data sequence, wherein $\alpha$ and $\beta$ represent the pair of the data segments located at the two sides of the boundary $\Delta$ in the data sequence ($\alpha$ represents a data segment preceding the boundary $\Delta$, and $\beta$ represents a data segment following the boundary $\Delta$). In addition, it should be noted that, in the above formulas, it is not necessary to accumulate all the pairs of data segments meeting the condition $\alpha \to \Delta \to \beta$, however, at least the pair of adjacent data segments adjoining to the boundary $\Delta$ and at least one pair of non-adjacent data segments (the two data segments in the pair of non-adjacent data segments are located at the two sides of the boundary $\Delta$, respectively and are not adjacent to each other). $F(\cdot)$ is a function with 3 independent variables, wherein $F(x,y,z)=F(x,z,y)$ $\forall x,y,z$; $F[A(\alpha,\beta), A(\alpha,\alpha), A(\beta,\beta)]$ or $F[A(\alpha,\beta), A(\alpha,\alpha \cup \beta), A(\beta,\alpha \cup \beta)]$ represents the association relationship between the pair of data segments $\alpha$ and $\beta$; $A(\alpha,\beta)$ represents the similarity between the data segments $\alpha$ and $\beta$ in one or more features, $A(\alpha,\alpha)$ represents the similarity between the inner data (the data units) inside the data segment $\alpha$ in one or more features, and $A(\beta,\beta)$ represents the similarity between the inner data (the data units) inside the data segment $\beta$ in one or more features.

Taking the candidate boundary $b_6$ in the candidate segmenting scheme of FIG. 3 as an example, the pair of adjacent data segments adjoining to the boundary includes data segments b and c, and the pairs of non-adjacent data segments located at the two sides of the boundary include the pair of data segments a and c, the pair of data segments b and d, and the pair of data segments a and d. Therefore, the evaluating device 103 may calculate the evaluation value of the boundary $b_6$ based on the association relationship between each pair of the above 4 pairs of data segments, instead of based on only the association relationship between the pair of adjacent data segments b and c adjoining to the boundary.

Then, the evaluating device 103 determines whether the candidate boundary is valid in the candidate segmenting scheme based on the evaluation value (step 206).

As a particular example, the evaluating device 103 may determine whether the evaluation value of the candidate boundary meets a predetermined relationship with a threshold (e.g. whether the evaluation value excels the threshold), and if yes, determines that the candidate boundary is valid, otherwise, determines that the candidate boundary is invalid. It should be appreciated that the threshold herein may be determined according to the actual application scenario, for example, it may be a predetermined theoretical value or a predetermined empirical value, or may be a value obtained by training data samples, thus it should not be limited to any particular value.

With the above apparatus or method in the embodiment, the input data sequence may be divided into one or more data segments such that the data within the same data segment are similar to each other in some features while the data of a data segment has distinct differences in the corresponding features from the data in the data segments that are adjacent to the data segment. When evaluating the segmenting loss of a candidate boundary, the apparatus and method shown in FIG. 1 and FIG. 2 take into consideration not only the association relationship between the pair of adjacent data segments adjoining to the candidate boundary, but also the association relationship of one or more pairs of non-adjacent data segments. Therefore, compared with the method of evaluating a boundary based on only the association relationship between the pair of adjacent data segments adjoining to the boundary, the apparatus and method shown in FIG. 1 and FIG. 2 can evaluate the validity of the boundary with an improved accuracy and the data segmenting scheme thus obtained is more reasonable.

Figure 4:
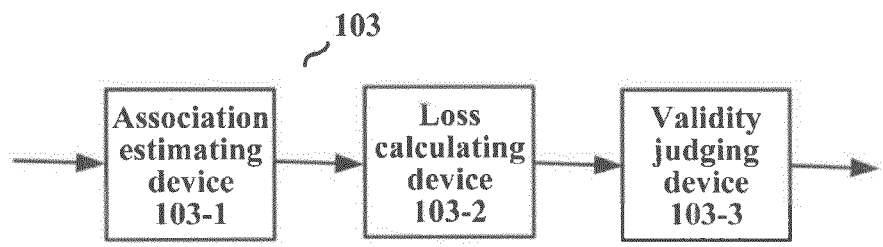
FIG. 4 is a schematic block diagram illustrating the structure of an evaluating device for evaluating the validity of a candidate boundary in a candidate segmenting scheme according to a particular embodiment.
Figure 5A:
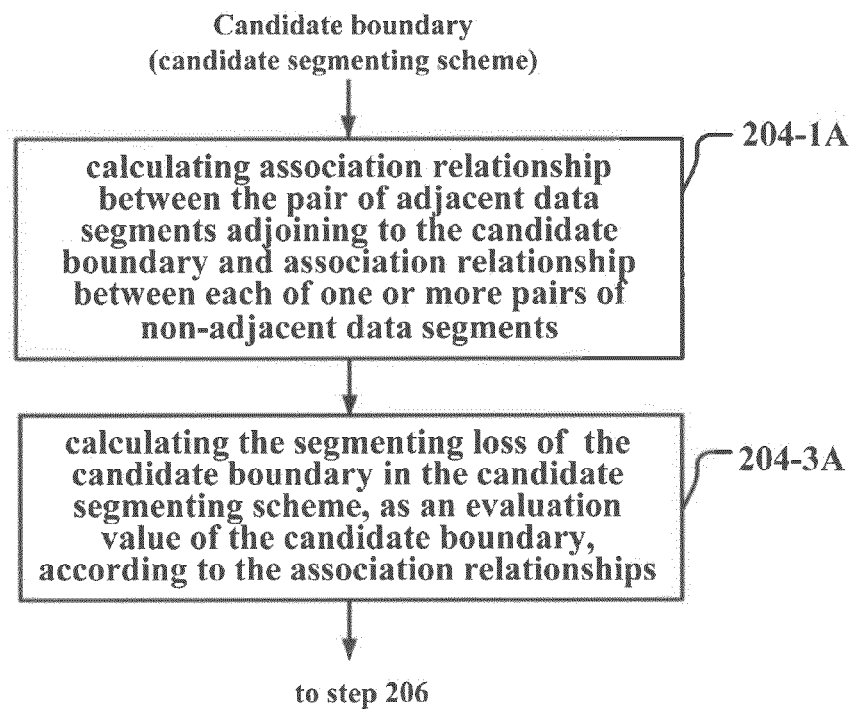
FIG. 5(A) is a schematic flow chart illustrating an example of a method of evaluating the validity of a candidate boundary in a candidate segmenting scheme.
Figure 5:
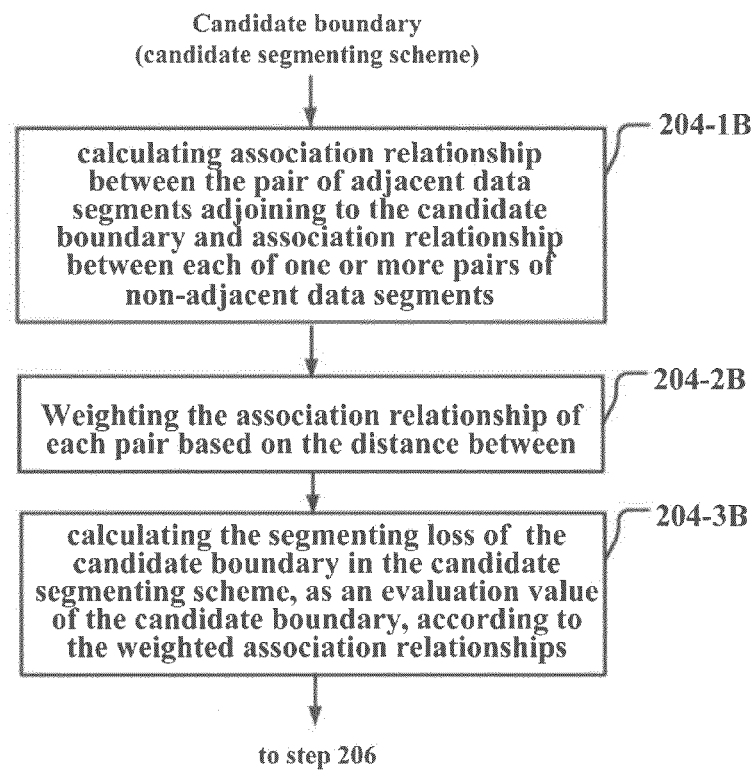
FIG. 5(B) is a schematic flow chart illustrating another example of a method of evaluating the validity of a candidate boundary in a candidate segmenting scheme.

FIG. 4 is a schematic block diagram showing the structure of the evaluating device 103 according to a particular embodiment, and FIGS. 5(A) and 5(B) are schematic flow charts respectively showing two particular examples of step 204 in FIG. 2 according to the particular embodiment. As shown in FIG. 4, the evaluating device 103 may include an association estimating device 103-1, a loss calculating device 103-2 and a validity judging device 103-3. The evaluating device 103 may utilize the method shown in FIG. 5(A) or 5(B) to evaluate a candidate boundary.

In the method of FIG. 5(A), the association estimating device 103-1 calculates the association relationship between the pair of adjacent data segments adjoining to the candidate boundary, and calculates the association relationship between each pair of the one or more pairs of non-adjacent data segments (step 204-1A), and outputs the calculated association relationships to the loss calculating device 103-2. The loss calculating device 103-2 estimates the segmenting loss of the candidate boundary according to the association relationships, as the evaluation value of the candidate boundary (step 204-3A). The validity judging device 103-3 determines whether the candidate boundary is valid in the candidate segmenting scheme according to the evaluation value obtained by the loss calculating device 103-2 (step 206). As a particular example, the validity judging device 103-3 may determine whether the evaluation value of the candidate boundary meets a predetermined relationship with a certain threshold (e.g. whether the evaluation value excels the threshold), and if yes, determines that the candidate boundary is valid, otherwise, determines that the candidate boundary is invalid.

For example, taking the candidate boundary $b_6$ in the candidate segmenting scheme shown in FIG. 3 as an example, the evaluating device 103 (the loss calculating device 103-2) may evaluate the boundary by using the following formula:

$$\vec{E}(b,c) = [C(b,c), C(a,c), C(b,d), C(a,d)] \quad (2)$$

In the above formula, $\vec{E}(b,c)$ represents the evaluation value of the candidate boundary $b_6$ between the data segments b and c; C(b,c) represents the association relationship between the pair of adjacent data segments b and c adjoining to the candidate boundary $b_6$; C(a,c), C(b,d), C(a,d) represent the association relationship between the pair of non-adjacent data segments a and c, the association relationship between the pair of non-adjacent data segments b and d, and the association relationship between the pair of non-adjacent data segments a and d, respectively.

The association estimating device 103-1 of the evaluating device 103 may utilize any appropriate method to estimate the association relationship between two data segments. In this example, a graph cut function C( ) is used to calculate the association relationship. That is, the evaluation value of the candidate boundary $b_6$ may be based on a plurality of graph cut function values between a plurality of pairs of data segments at the two sides of the boundary. In other words, $\vec{E}(b,c)$ is a feature vector formed by the plurality of cascaded graph cut function values to represent the evaluation value of the candidate boundary $b_6$ between the data segments b and c.

As a particular example, the association estimating device 103-1 of the evaluating device 103 may calculate the association relationship between two data segments based on the similarity between the two data segments and the similarity between the data units within each data segment of the two data segments. Taking the data segments a and d shown in FIG. 3 as an example, the association relationship between the two data segments may be calculated by the following formula:

$$C(a,d) = \frac{A(a,d)}{A(a,a)} + \frac{A(a,d)}{A(d,d)} \quad (3)$$

wherein A(a,d) represents the similarity between the data segments a and d in a certain feature or certain features (the description of the features is described above and is not repeated herein), A(a,a) represents the similarity of the data inside the data segment a (the similarity of between the data units inside the data segment a), and A(d,d) represents the similarity of the data inside the data segment d (the similarity of between the data units inside the data segment d).

As a particular example, the association estimating device 103-1 may obtain the similarity between two data segments by calculating the similarities between data units included in different ones of the two data segments. In addition, the association estimating device 103-1 may obtain the similarity within a single data segment by calculating the similarities between the data units within the single data segment. For example, the following formula (4) gives a particular example of calculating the similarity between the two data segments a and d:

$$A(a,d) = \sum_{s_i \in a} \sum_{s_j \in d} S(s_i, s_j) \quad (4)$$

The formula (4) may also be used to calculate the similarity of the data inside a single data segment, such as A(a,a) and A(d,d).

As another particular example, the association estimating device 103-1 may utilize the lengths of the data units within the two data segments to weight the similarity between two data units from different ones of the two data segments, respectively. Particularly, the lengths of the data units in the two data segments may be used as the weights to calculate a weighted average similarity between the two data segments (or an average similarity normalized by using the lengths), as the similarity between the two data segments. And the association estimating device 103-1 may weight the similarity between the data units within a single data segment by using the lengths of the data units within the data segment. That is, the lengths of the data units within the data segment may be used as the weights to calculate the weighted average similarity of the data inside the data segment (or the average similarity normalized by using the lengths), as the similarity of the data within the data segment. As a particular example, the following formula may be used to calculate the similarity between the two data segments a and d:

$$A(a,d) = \frac{\sum_{s_i \in a} \sum_{s_j \in d} S(s_i, s_j) \cdot L(s_i) \cdot L(s_j)}{\sum_{s_i \in a} \sum_{s_j \in d} L(s_i) \cdot L(s_j)} \quad (4a)$$

The formula (4a) may also be used to calculate the similarity of the data inside a single data segment, such as A(a,a) and A(d,d).

In the formulas (4) and 4(a), $s_i$ represents a data unit in the data segment a, $s_j$ represents a data unit in the data segment d; $S(s_i, s_j)$ represents the similarity between $s_i$ and $s_j$ in a certain feature or some certain features (in the case of video or image sequence, for example, the feature may be color, texture and/or contents, etc.). In addition, $L(s_i)$ represents the length of the data unit $s_i$, $L(s_j)$ represents the length of the data unit $s_j$.

The association estimating device 103-1 may calculate the similarity S(•) between two data units by using any appropriate feature(s) and an appropriate method according to the actual application scenario. In the case that the input data sequence is a video sequence, the following formula may be utilized to calculate the similarity between the two data units:

$$S_{C'}(s_i, s_j) = I(\text{mean}_{f_m \in s_1}[H_{C'}(f_m)], \text{mean}_{f_n \in s_1}[H_{C'}(f_n)]) \quad (5)$$

Wherein $S_{C'}(s_i, s_j)$ represents the similarity between the data units in color; $f_m$ represents a frame in $s_i$, $f_n$ represents a frame in $s_j$; $H_{C'}(\bullet)$ represents HSV histogram (e.g. HSV of 64 bins, wherein each channel corresponds to two bits, and thus 6 bits in total) of the frame; mean(•) represents a mean value function; I(•) represents the intersection of the histograms (i.e. the overlapping ratio of the two histograms of the two frames).

The method of FIG. 5(B) is similar to that in FIG. 5(A), the difference lies in that, in FIG. 5(B), after the association estimating device 103-1 calculates the association relationships between the pairs of data segments as shown in step 204-1B (the step 204-1B is similar to step 204-1A), the loss calculating device 103-2 weights the association relationships by using the distance between the data segments in each pair of (step 204-2B), and estimates the segmenting loss of the candidate boundary by using the weighted association relationships, as the evaluation value of the boundary (step 204-3B). Here, the weight is in inverse proportion to the distance, that is, the larger the distance between the two data segments is, the smaller the weights of the association relationship between the two data segments is. The validity judging device 103-3 determines whether the candidate boundary is valid in the corresponding candidate segmenting scheme according to the evaluation value obtained by the loss calculating device 103-2 (step 206). As a particular example, the validity judging device 103-3 may determine whether the evaluation value of the candidate boundary meets a predetermined relationship with a certain threshold (whether the evaluation value excels the threshold), and if yes, determine that the candidate boundary is valid, otherwise, determine that the candidate boundary is invalid.

Taking the formula (1) as an example, the evaluation value of the candidate boundary $\Delta$ may be calculated by using the following weighted function:

$$E'(\Delta) = \sum_{\alpha \to \Lambda \to \beta} D_d(\alpha, \beta) \cdot F[A(\alpha, \beta), A(\alpha, \alpha), A(\beta, \beta)] \quad (6)$$

Taking the formula (1a) as an example, the evaluation value of the candidate boundary $\Delta$ may be calculated by using the following weighted function:

$$E'(\Delta) = \sum_{\alpha \to \Lambda \to \beta} D_d(\alpha, \beta) \cdot F[A(\alpha, \beta), A(\alpha, \alpha \cup \beta), A(\beta, \alpha \cup \beta)] \quad (6a)$$

In formulas (6) and (6a), $E'(\Delta)$ represents the distance-weighted evaluation value of the candidate boundary $\Delta$; $D_d(\alpha, \beta)$ represents an attenuation function which attenuates monotonically with the distance between the data segments $\alpha$ and $\beta$. Similar to formula (1), in formulas (6) and (6a) it is not necessary to accumulate the association relationships between all the pairs of the data segments that meet the condition $\alpha \to \Delta \to \beta$, however, at least the pair of adjacent data segments adjoining to the candidate boundary $\Delta$ and at least one pair of non-adjacent data segments (the two data segments in the one pair of non-adjacent data segments locate the two sides of $\Delta$ respectively) should be included.

As a particular example, the association relationship calculated using formula (3) may be weighted by using the formula (7):

$$C'(a, d) = \left( \frac{A(a, d)}{A(a, a)} + \frac{A(a, d)}{A(d, d)} \right) \cdot \exp[-v \cdot D(a, d)] \quad (7)$$

Wherein C'(a,d) represents the weighted association relationship between the two data segments a and d; D(a,d) represents the distance between the two data segments a and d; v represents a predetermined constant. In addition, exp[$-v \cdot D$(a,d)] in formula (7) is a particular example of the attenuation function which attenuates monotonically with the distance between the two data segments a and d. It should be appreciated that any other appropriate attenuation function may be used, which is not detailed here.

The distance between two data segments may be calculated by using any appropriate method. For example, the distance between two data segments may be the number of data segments between the two data segments. For another example, the distance between two data segments may be the number of data units between the two data segments. For yet another example, the distance between two data segments may be the total length of data units between the two data segments (for example the length here may be represented by using the number of frames or time). Of course, the disclosure is not limited to these.

The constant v may be an empirical value or experimental value predetermined according to the actual application scenarios. For example, in the case of video data sequence, the value of v may be between 0.02 and 0.1, and preferably, the value of v may be 0.05 (1/second), and so on. Of course, the above values are merely examples, it should be appreciated that v may have other appropriate values according to the different application scenarios, which is not detailed herein.

Compared with the method of FIG. 5(A), in the method of FIG. 5(B) the distance between a pair of data segments is used to weight the association relationship between the data segments of the pair. Therefore, the pair of data segments having a larger distance therebetween corresponds to a smaller weight and thus contributes less to the resultant evaluation value. In this manner, in the case that other data segments between a pair of data segments that are distant apart in the data sequence are distinctly different from the pair (i.e. the similarity is small), the two data segments will be divided apart even if the association relationship between the two data segments is relatively large (i.e. the similarity is relatively high). With the method, the evaluation of the candidate boundary is more reasonable, and thus the resultant data segmenting scheme is better.

Taking the candidate boundary $b_6$ in the data segmenting scheme shown in FIG. 3 as an example again, the evaluating device 103 (e.g. the validity judging device 103-3) may utilize the following formula (8) to convert the cascaded graph cut value $\vec{E}(b,c)$ obtained by using formula (2) to an evaluation value for classification:

$$E(b,c) = \vec{E}(b,c) \cdot \vec{p} \quad (8)$$

In the above formula (8), p represents the projection that can distinguish the correct boundaries from the erroneous ones, E (b,c) represents the converted (projected) evaluation value of the boundary $b_6$.

As a particular example, the evaluating device 103 (e.g. the validity judging device 103-3) may determine whether the evaluation value (e.g. E (b,c) obtained by using formula (8)) of the candidate boundary meets a predetermined relationship with a certain threshold (e.g. whether the evaluation value excels the threshold), and if yes, determine that the candidate boundary is valid, otherwise, determine that the candidate boundary is invalid. The threshold may be a theoretical value or an empirical value predetermined based on the actual application scenarios, which is not detailed herein.

In addition, the projection p in formula (8) may be obtained by training the training samples by use of the Linear Discriminate Analysis (LDA) method. For example, based on Fisher Criterion, the projection may be obtained by using the following formula:

$$\vec{p} = (\Sigma_+ + \Sigma_-)^{-1} * (\vec{\mu}_- - \vec{\mu}_+) \quad (9)$$

Wherein $\mu_+$ and $\Sigma_+$ represent the mean value and covariance of feature vectors of the positive training samples, respectively, $\mu_-$ and $\Sigma_-$ represent the mean value and covariance of feature vectors of the negative training samples, respectively; the positive training samples may include the samples generated by using the correct boundaries and the negative training samples may include the samples generated by using the erroneous boundaries (e.g. erroneous boundaries that are randomly selected). It should be appreciated that, the above method of generating the projection p is merely illustrative. In other examples other appropriate methods (e.g. support vector machine) may be used to obtain the projection p, which is not detailed herein.

Figure 6:
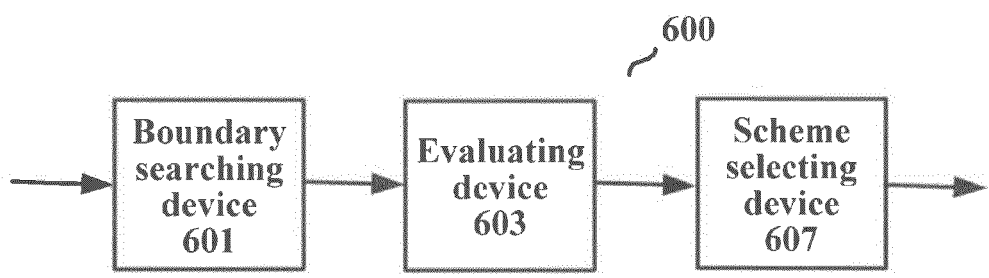
FIG. 6 is a schematic block diagram illustrating the structure of a data segmenting apparatus according to an embodiment.

FIG. 6 is a schematic block diagram illustrating the structure of a data segmenting apparatus according to another embodiment. Similar to the data segmenting apparatus 100 in FIG. 1, the data segmenting apparatus 600 may include a boundary searching device 601c and an evaluating device 603 configured to evaluate the candidate boundaries. The difference lies in that, the data segmenting apparatus 600 further includes a scheme selecting device 607.

As a particular embodiment, the boundary searching device 601 and the evaluating device 603 in the data segmenting apparatus 600 may utilize the method in the embodiments/examples described above with reference to FIG. 2 and FIG. 4 to evaluate the candidate boundaries, that is, the boundary searching device 601 and the evaluating device 603 may have functions and structures similar to those of the boundary searching device 101 and the evaluating device 103 in the embodiments or examples described above with reference to FIG. 1 and FIG. 3, which is not repeated herein.

The scheme selecting device 607 is configured to select, based on the evaluation (the validity and the evaluation value of each candidate boundary) made by the evaluating device 603 to the candidate boundaries in each candidate segmenting scheme, an optimum segmenting scheme from one or more candidate segmenting schemes formed by one or more candidate boundaries searched by the boundary searching device 601.

Figure 7A:
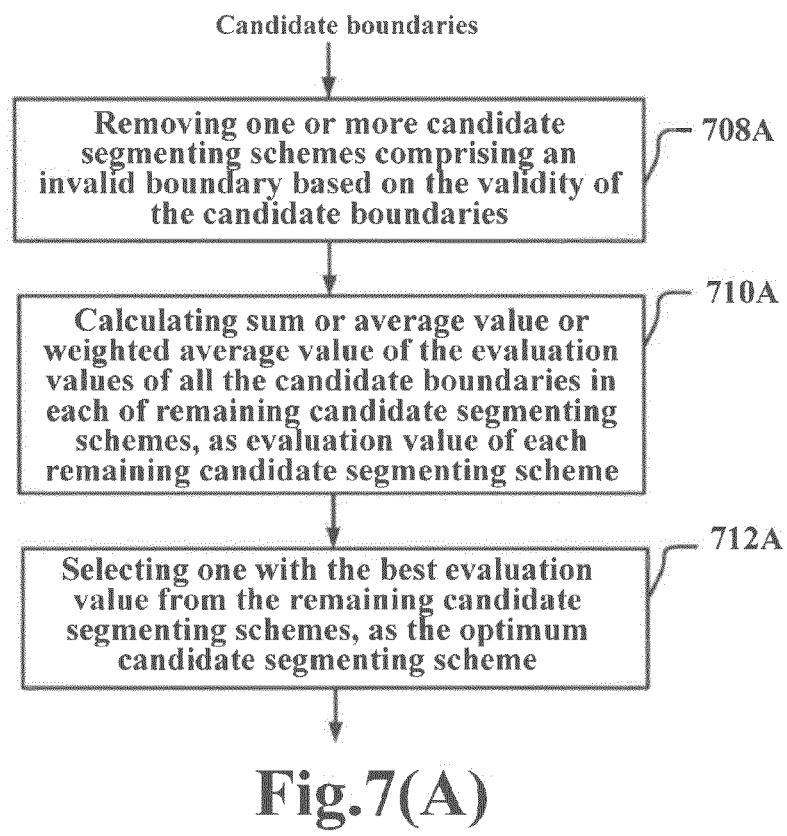
FIG. 7(A) is a schematic flow chart illustrating a method of searching for an optimum data segmenting scheme according to a particular embodiment.
Figure 7B:
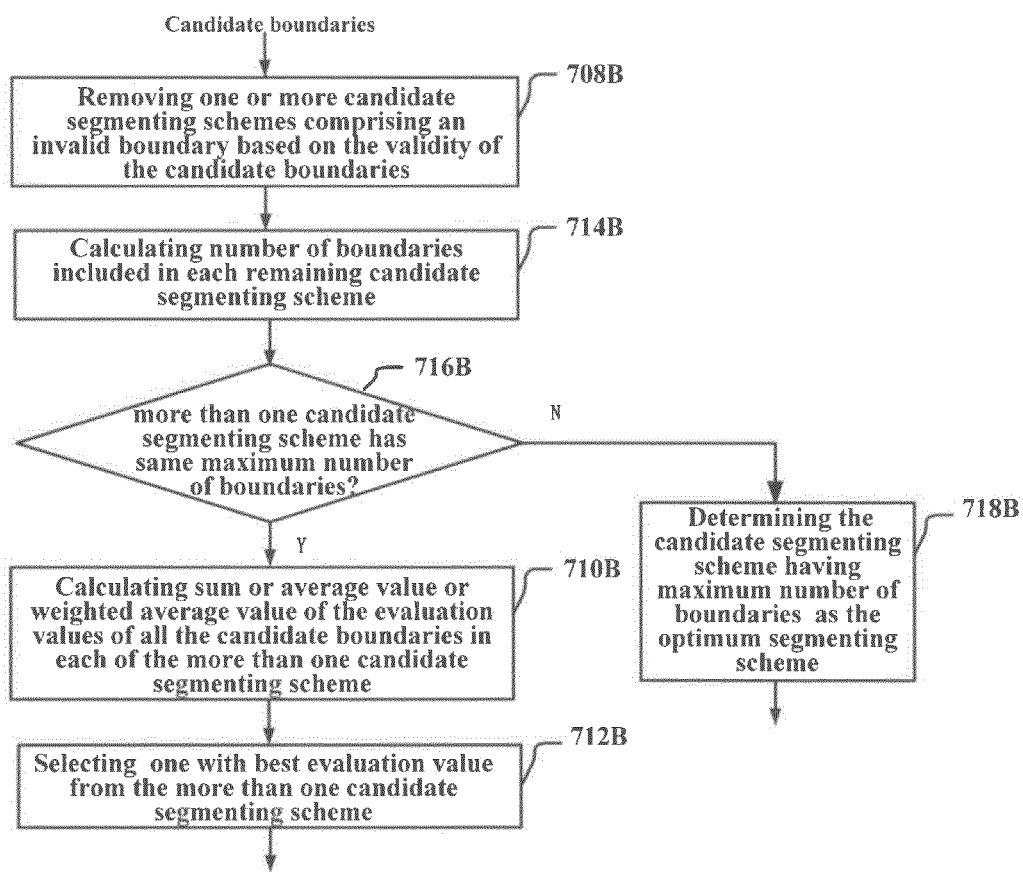
FIG. 7(B) is a schematic flow chart illustrating a method of searching for an optimum data segmenting scheme according to another particular embodiment.

As a particular embodiment, the scheme selecting device 607 may utilize the method as shown in FIG. 7(A) or 7(B) to search for the optimum segmenting scheme. The scheme selecting device 607 according to the embodiment is described below with reference to FIG. 7(A).

In the embodiment shown in FIG. 7(A), the scheme selecting device 607 may firstly remove, based on the validity of the candidate boundaries in each candidate segmenting scheme, one or more segmenting schemes containing an invalid boundary from one or more candidate segmenting schemes (step 708A); then, calculate the sum or the average value or the weighted average value of the evaluation values of all the candidate boundaries in each remaining candidate segmenting scheme, as the evaluation value of each remaining candidate segmenting scheme (step 710A), and select an optimum one from the remaining candidate segmenting schemes based on the evaluation value of each remaining candidate segmenting scheme, as the optimum candidate segmenting scheme (step 712A).

In the embodiment shown in FIG. 7(B), the scheme selecting device 607 may firstly remove, based on the validity of the candidate boundaries in each candidate segmenting scheme, one or more segmenting schemes containing an invalid boundary from one or more candidate segmenting schemes (step 708B); calculate the number of boundaries included in each remaining candidate segmenting scheme (step 714B); and then determine whether there are more than one candidate segmenting scheme having the same maximum number of boundaries (step 716B); if no, the candidate segmenting scheme having the maximum number of boundaries is determined as the optimum segmenting scheme (step 718B). If there are more than one candidate segmenting scheme having the same maximum number of boundaries, the scheme selecting device 607 calculates the sum or the average value or the weighted average value of the evaluation values of all the candidate boundaries in each of the more than one candidate segmenting scheme having the same maximum number of boundaries, as the evaluation value of each of the more than one candidate segmenting scheme (step 710B), and selects an optimum one from the more than one candidate segmenting scheme having the same maximum number of boundaries, based on the evaluation value of each of the more than one candidate segmenting scheme, as the optimum candidate segmenting scheme (step 712B).

In another particular embodiment, the scheme selecting device 607 may select the optimum segmenting scheme based on Dynamic Programming (DP) method. The DP method decomposes the problem of searching for the optimum segmenting boundary sequence into recursive searching steps. In each DP step, candidate preceding boundary sequences, instead of single neighboring boundary, are searched.

Figure 8:
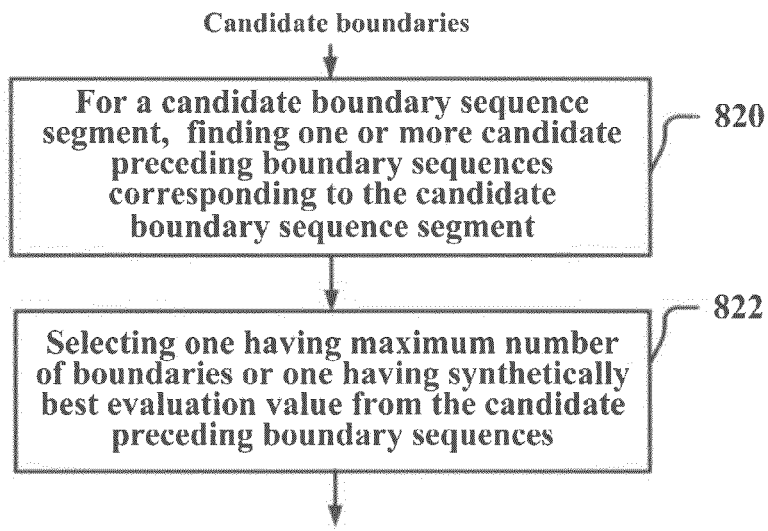
FIG. 8 is a schematic flow chart illustrating a method of searching for an optimum data segmenting scheme according to another particular embodiment.

For example, the scheme selecting device 607 may search for the optimum segmenting scheme by iteratively performing the DP method steps as shown in FIG. 8. FIG. 8 shows the DP method steps of searching for the optimum segmenting scheme in the candidate boundaries according to an embodiment. As described above, different combinations of the candidate boundaries form different candidate segmenting schemes. In the embodiment shown in FIG. 8, a predetermined criterion is used to select one with the best performance among the candidate segmenting schemes. Particularly, for a candidate boundary or a candidate boundary sequence segment containing at least one candidate boundary, an optimum one is selected from candidate preceding boundary sequences. For different candidate boundaries or candidate boundary sequence segments, the above steps are iteratively performed, until a complete data segmenting scheme is formed.

For a candidate boundary sequence segment containing at least one candidate boundary, its candidate preceding boundary sequence is a boundary sequence which contains at least one candidate boundary preceding the candidate boundary sequence segment according to an order of processing the input data sequence and does not contain any candidate boundary following the candidate boundary sequence segment according to the order of processing the input data sequence. In addition each candidate boundary in the candidate preceding boundary sequence should be determined (for example by evaluating device 103/603) as valid. The so-called order of processing the input data sequence may be the order of sequentially processing the input data sequence from the beginning to the end of the data sequence (Taking the data sequence shown in FIG. 3 as an example, the order from $b_0$ to $b_{10}$), or may be the reverse order of processing the input data sequence from the end to the beginning of the data sequence ((Taking the data sequence shown in FIG. 3 as an example, the order from $b_{10}$ to $b_0$). In the case of sequentially processing the input data sequence, each candidate preceding boundary sequence is a boundary sequence that contains at least one candidate boundary preceding the candidate boundary sequence segment according to the data arrangement order of the input data sequence and does not contain any candidate boundary following the candidate boundary sequence segment according to the data arrangement order of the input data sequence. Thus if the input data sequence is processed from its beginning, the beginning boundary of each candidate preceding boundary sequence is the beginning of the input data sequence. In the case of reversely processing the input data sequence, each candidate preceding boundary sequence is a boundary sequence that contains at least one candidate boundary following the candidate boundary sequence segment according to the data arrangement order of the input data sequence and does not contain any candidate boundary preceding the candidate boundary sequence segment according to the data arrangement order of the input data sequence. Thus if the input data sequence is processed from its end, the beginning boundary of each candidate preceding boundary sequence is the end of the input data sequence.

As shown in FIG. 8, in step 820, for a candidate boundary sequence segment, the scheme selecting device 607 is configured to find one or more candidate preceding boundary sequences corresponding to the candidate boundary sequence segment. Then in step 822 the scheme selecting device 607 selects one from the candidate preceding boundary sequences based on a predetermined selection criterion, as the preceding boundary sequence of the candidate boundary sequence segment. This preceding boundary sequence together with the candidate boundary sequence segment constitutes the candidate preceding boundary sequence of a candidate boundary sequence segment to be processed in the following steps. The scheme selecting device 607 may save the preceding boundary sequence in a storage device (not shown in Figure, the storage device may be a memory configured inside the data segmenting apparatus, or may be a memory that is provided outside the data segmenting apparatus and may be accessed by the components of the data segmenting apparatus) for the following DP steps.

The selection criterion may be as the follows:
a) to select a candidate preceding boundary sequence that contains a maximum number of boundaries, or
b) if more than one candidate preceding boundary sequence has the same maximum number of boundaries, to select a candidate preceding boundary sequence that is optimum synthetically (for example, a candidate preceding boundary sequence that has the optimum average value of the evaluation values or has the optimum weighted average value of the evaluation values).

The scheme selecting device 607 may repeat steps 820 and 822, until a complete data segmenting scheme is formed.

In the embodiment as shown in FIG. 8, for a candidate boundary sequence segment, its possible (candidate) preceding boundary sequences, instead of a single neighboring boundary, are searched; and then one is selected from the multiple possible preceding boundary sequences. Compared with the method of FIG. 7, the method shown in FIG. 8 may accelerate the searching and thus it may be more applicable to bulk data searching.

Figure 9:
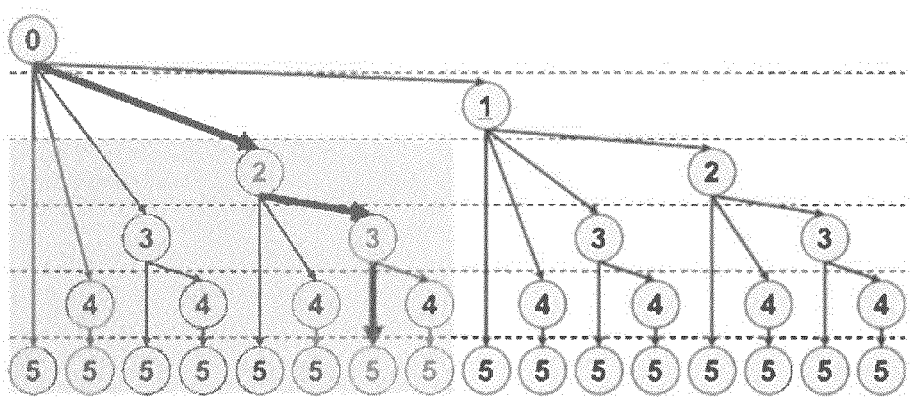
FIG. 9 is a schematic diagram illustrating an example of dynamic programming (DP) search tree.

The searching based on DP method is further described below with reference to a particular example shown in FIG. 9. FIG. 9 shows an example of a DP search tree. In the example, it is assumed that 6 candidate boundaries, represented by the digits 0,1,2,3,4,5, respectively in FIG. 9, are searched from the input data sequence. FIG. 9 illustrates the different candidate segmenting schemes formed by the different combination of the 6 candidate boundaries. In the search space shown in FIG. 9, there are 16 candidate segmenting schemes in total. For example, it is supposed that in a DP step the candidate boundary sequence (2,3,5) is processed. As can be seen from the Figure, a possible preceding boundary sequence of the candidate boundary sequence is (0,2,3). The two boundary sequences may be combined together to form a complete data segmenting scheme (0,2,3,5). Each DP step is to select, based on the above selection criterion, an optimum preceding boundary sequence which has the maximum number of boundaries or is optimum synthetically in the evaluation values of its boundaries.

Figure 10:
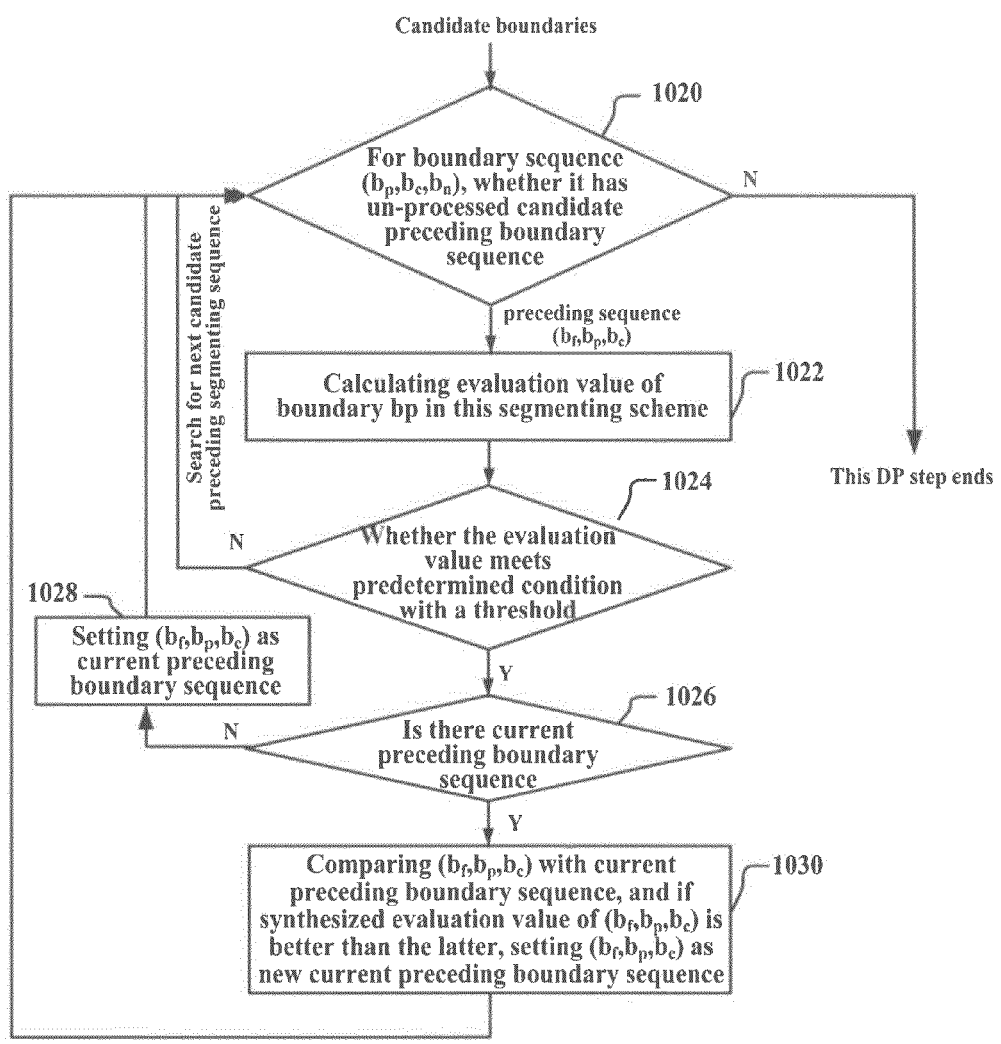
FIG. 10 shows a particular example of searching for an optimum preceding boundary sequence by using dynamic programming method.

FIG. 10 shows a particular example of a searching step in the DP.

As shown in FIG. 10, it is supposed the currently processed boundary sequence is $(b_p, b_c, b_n)$, wherein $b_p, b_c, b_n$ represents the boundaries in the sequence.

In step 1020, a candidate preceding boundary sequence of $(b_p, b_c, b_n)$ is searched, this candidate preceding boundary sequence is represented by $(b_f, b_p, b_c)$. Here $b_f$ represents a candidate boundary preceding the sequence $(b_p, b_c, b_n)$ according to the data arrangement order of the data sequence.

Then in step 1022, the evaluation value of the candidate boundary $b_p$ in the sequence $(\ldots, b_f, b_c, b_n)$ is calculated, and in step 1024, it is determined whether the evaluation value meets a predetermined relationship with a threshold (e.g. less than the threshold), if yes, it is determined that the candidate boundary $b_p$ is valid in the sequence $(b_f, b_p, b_c, b_n)$ and the processing goes to next step 1026; otherwise, it is determined that the candidate boundary $b_p$ is invalid in the sequence $(\ldots, b_f, b_p, b_c, b_n)$ and the processing returns to step 1020 to search for another candidate preceding boundary sequence.

In step 1026, it is determined whether the current preceding boundary sequence of $(b_p, b_c, b_n)$ has been found in the previous DP step, if yes, the processing goes to step 1030; otherwise, the processing goes to step 1028 in which $(b_f, b_p, b_c)$ is set as the current preceding boundary sequence of $(b_p, b_c, b_n)$, and then the processing returns to step 1020 to process another candidate preceding boundary sequence.

In step 1030, based on, the synthesized evaluation values of $(b_f, b_p, b_c)$ and the current preceding boundary sequence are compared based on the evaluation value of each candidate boundary. If the synthesized evaluation value of $(b_f, b_p, b_c)$ excels that of the current preceding boundary sequence, $(b_f, b_p, b_n)$ is set as the new current preceding boundary sequence (i.e. the current preceding boundary sequence is replaced to be $(b_f, b_p, b_c)$); otherwise, the processing returns to step 1020 to process another candidate preceding boundary sequence. As particular examples, the synthesized evaluation value of a boundary sequence may be the average value or weighted average value of the evaluation values of the boundaries contained in the boundary sequence.

Figure 12:
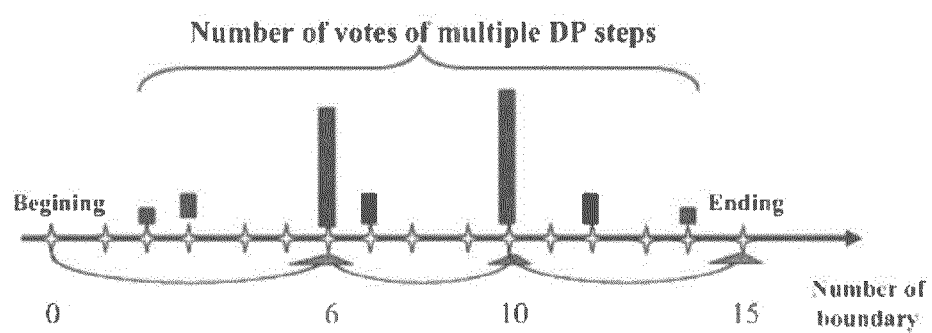
FIG. 12 is a schematic diagram illustrating a process of voting the candidate boundaries by using multiple DP steps.

The above DP method may be repeated many times (the DP step is performed iteratively, until a complete data segmenting scheme is formed) by using Monte Carlo method. After each round of DP method is performed, the boundaries in an effective boundary sequence may be voted. Then after the multiple rounds of the DP method are performed, a data segmenting scheme may be selected based on the number of votes of each candidate boundary. For example, a candidate boundary with the number of votes exceeding a threshold may be determined as a correct boundary (it is appreciated that the threshold may be determined as required by the actual application, and should not be limited to any particular value), as a boundary to be included in the resultant data segmenting scheme. FIG. 12 shows an example in which the boundaries are voted after multiple rounds of DP method. In FIG. 12, the horizon axis represents the data sequence, where 0, 1, ..., 15 represents the numbers of the candidate boundaries in the sequence, and the dark-colored block above each candidate boundary represents the number of votes for the boundary. The taller the hock is, the larger the number of the votes is. One or more candidate boundaries corresponding to the maximum number of votes may be selected as the correct boundaries. For example, the candidate boundaries 6 and 10 gain the most votes, and thus may be selected as correct boundaries. In this way the resultant data segmenting scheme may be (0, 6, 10, 15).

When performing multiple rounds of DP method, different thresholds may be used in the DP steps in evaluating the validity of a boundary. As a preferred example, the threshold adopted in a DP step may be a random valued obtained by performing statistic to a plurality of training samples. As a particular example, statistics may be performed to the training samples to obtain a normal distribution model N(μ, σ), and a random threshold complied with the model may be generated. Particularly, the following formula may be utilized:

$$\mu = (\vec{\mu}_- + \vec{\mu}_+) \cdot \vec{p}/2 \qquad (10)$$

Wherein μ represents the expectation of the random threshold; $\mu_+$ represents the mean value of the feature vectors of positive training samples; $\mu_-$ represents the mean value of the feature vectors of negative training samples; p represents the projection that can distinguish the correct boundaries from the erroneous boundaries. A positive training sample may be a sample generated by using correct boundaries, and a negative training sample may be generated by using erroneous boundaries (e.g. erroneous boundaries that are selected randomly). The other symbols in formula (10) are the same as those in formula (9), the description of which is not repeated here.

Figure 11:
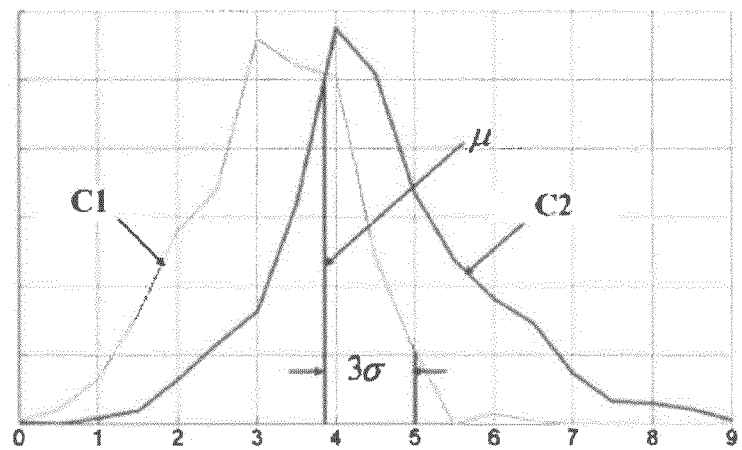
FIG. 11 is a schematic diagram illustrating the determination of a random threshold to be used in boundary evaluation by using a statistic result of training samples.

FIG. 11 is a schematic diagram showing the variance of the distribution of the randomly determined threshold. The curve C1 represents the distribution of the positive training samples after projection, and the curve C2 represents the distribution of the negative training samples after projection. As shown, the selection of variance is to ensure that most of the positive training samples excel the threshold. Using such random threshold distribution, the correct boundaries and the erroneous boundaries may be distinguished effectively.

In this example, since each DP step adopts a threshold different from those in other DP steps, the DP searching may be more stable.

As an example, when using the DP method to search the segmenting scheme, heuristic search may be used to accelerate the searching. For example, for each candidate boundary, a temporary optimum segmenting scheme may be found by comparing all the valid candidate boundary sequences that contain the candidate boundary and utilize this candidate boundary as an extreme point. With the progression of the DP searching, multiple temporary optimum segmenting schemes may be found. For each candidate boundary, the number of times that this candidate boundary appears in these temporary optimum segmenting schemes may be counted, and if the number of times exceed a threshold (the threshold may be a valued predetermined according to actual application scenario and should not be limited to any particular value), the candidate boundary may be heuristically determined as a correct boundary. In this way, in the following DP steps the candidate boundary sequence excluding this candidate boundary and the sequence in which this candidate boundary is evaluated as invalid may be skipped. For example, as shown in FIG. 9, if the candidate boundary 1 is heuristically determined as a correct boundary, since the candidate schemes shown in the left half (the shadowed part) of the Figure each exclude the candidate boundary 1, these candidate schemes shown in the left half (the shadowed part) may be skipped in the following DP steps. Thus, using the heuristic search may accelerate the searching significantly.

It should be understood that the above embodiments and examples are illustrative, rather than exhaustive. The present disclosure should not be regarded as being limited to any particular embodiments or examples stated above. For example, the data segmenting apparatus or method in the embodiments or examples mentioned above may include an input device or an input step for receiving the input data sequence, the description of which is not detailed here.

The data segmenting apparatus or method according to the embodiments or examples of the disclosure may be applicable to any application scenarios of processing various electronic data, such as video, audio, text, still image, or any combination thereof. For instance, the data segmenting apparatus or method according to the embodiments or examples of the disclosure may be applicable to various video processing apparatus or system, such as digital camera, digital video camera, digital video recorder, video server, or video monitoring system, etc.; and may be applicable to other data processing apparatus or system, such as data (including video, audio and/or text, etc.) browsing, summarization, retrieval, and/or storage, etc.

As an example, the components, units or steps in the above apparatuses and methods can be configured with software, hardware, firmware or any combination thereof. The above data segmenting apparatus may be incorporated into other data processing apparatus or system as a component thereof, or may be connected to other data processing apparatus or system as a separate device.

Figure 13:
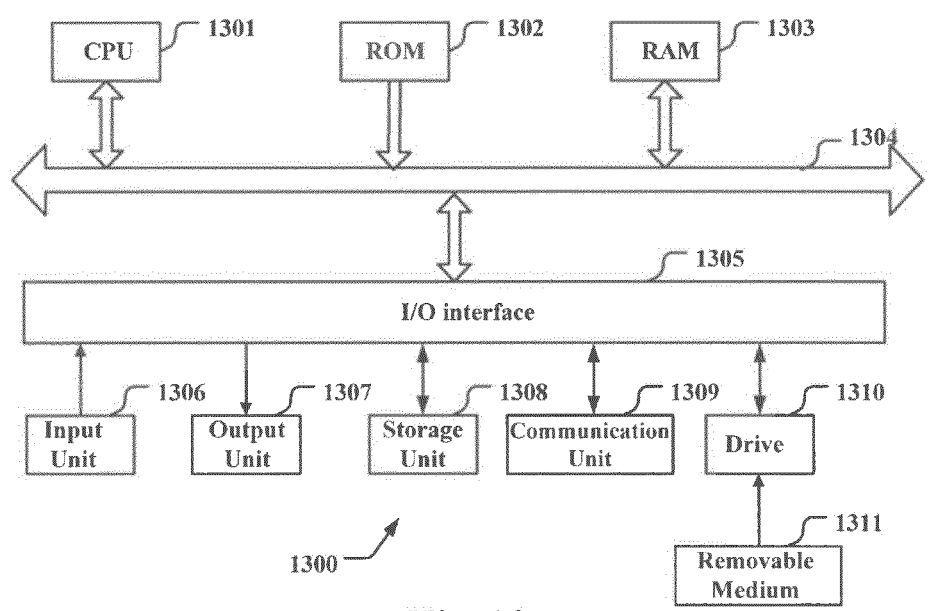
FIG. 13 is a schematic block diagram illustrating the structure of computer for realizing the disclosure.

As an example, in the case of using software or firmware, programs constituting the software for realizing the above method or apparatus can be installed to a computer with a specialized hardware structure (e.g. the general purposed computer 1300 as shown in FIG. 13) from a storage medium or a network. The computer, when installed with various programs, is capable of carrying out various functions.

In FIG. 13, a central processing unit (CPU) 1301 executes various types of processing in accordance with programs stored in a read-only memory (ROM) 1302, or programs loaded from a storage unit 1308 into a random access memory (RAM) 1303. The RAM 1303 also stores the data required for the CPU 1301 to execute various types of processing, as required. The CPU 1301, the ROM 1302, and the RAM 1303 are connected to one another through a bus 1304. The bus 1304 is also connected to an input/output interface 1305.

The input/output interface 1305 is connected to an input unit 1306 composed of a keyboard, a mouse, etc., an output unit 1307 composed of a cathode ray tube or a liquid crystal display, a speaker, etc., the storage unit 1308, which includes a hard disk, and a communication unit 1309 composed of a modem, a terminal adapter, etc. The communication unit 1309 performs communicating processing. A drive 1310 is connected to the input/output interface 1305, if needed. In the drive 1310, for example, removable media 1311 is loaded as a recording medium containing a program of the present invention. The program is read from the removable media 1311 and is installed into the storage unit 1308, as required.

In the case of using software to realize the above consecutive processing, the programs constituting the software may be installed from a network such as Internet or a storage medium such as the removable media 1311.

Those skilled in the art should understand the storage medium is not limited to the removable media 1311, such as, a magnetic disk (including flexible disc), an optical disc (including compact-disc ROM (CD-ROM) and digital versatile disk (DVD)), an magneto-optical disc (including an MD (Mini-Disc) (registered trademark)), or a semiconductor memory, in which the program is recorded and which are distributed to deliver the program to the user aside from a main body of a device, or the ROM 1302 or the hard disc involved in the storage unit 1308, where the program is recorded and which are previously mounted on the main body of the device and delivered to the user.

The present disclosure further provides a program product having machine-readable instruction codes which, when being executed, may carry out the methods according to the embodiments.

Accordingly, the storage medium for bearing the program product having the machine-readable instruction codes is also included in the disclosure. The storage medium includes but not limited to a flexible disk, an optical disc, a magneto-optical disc, a storage card, or a memory stick, or the like.

In the above description of the embodiments, features described or shown with respect to one embodiment may be used in one or more other embodiments in a similar or same manner, or may be combined with the features of the other embodiments, or may be used to replace the features of the other embodiments.

As used herein, the terms the terms "comprise," "include," "have" and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

Further, in the disclosure the methods are not limited to a process performed in temporal sequence according to the order described therein, instead, they can be executed in other temporal sequence, or be executed in parallel or separatively. That is, the executing orders described above should not be regarded as limiting the method thereto.

While some embodiments and examples have been disclosed above, it should be noted that these embodiments and examples are only used to illustrate the present disclosure but not to limit the present disclosure. Various modifications, improvements and equivalents can be made by those skilled in the art without departing from the scope of the present disclosure. Such modifications, improvements and equivalents should also be regarded as being covered by the protection scope of the present disclosure.

What is claimed is:

1. An apparatus for segmenting an input data sequence, comprising:
    a boundary searching device, configured to search for one or more candidate boundaries in the input data sequence, in order to obtain one or more candidate segmenting schemes formed by different combinations of these candidate boundaries;
    an evaluating device, configured to, with respect to each candidate segmenting scheme, generate an evaluation value of each candidate boundary in the candidate segmenting scheme, by evaluating a segmenting loss caused by using the candidate boundary in the candidate segmenting scheme to segment the input data sequence, and determine whether the candidate boundary is valid in the candidate segmenting scheme according to the evaluation value, the evaluation value reflecting association relationship between a pair of adjacent data segments adjoining to the candidate boundary and association relationship between each of one or more pairs of non-adjacent data segments, each pair of non-adjacent data segments comprising two non-adjacent data segments respectively located at two sides of the candidate boundary;
    an association estimating device, configured to estimate the association relationship between the pair of adjacent data segments adjoining to the candidate boundary and the association relationship between each of the one or more pairs of non-adjacent data segments;
    a loss calculating device, configured to weight the association relationship between each pair of data segments according to a distance between two data segments in the each pair, and calculate the segment loss according to the weighted association relationships, as the evaluation value of the candidate boundary, wherein the larger the distance is, the smaller a corresponding weight is; and
    a validity judging device, configured to determine, according to the evaluation value, validity of the candidate boundary in corresponding candidate segmenting scheme.

2. The apparatus of claim 1, wherein each data segment comprises at least one data unit and the association estimating device is further configured to estimate the association relationship between each pair of data segments by:
    calculating a similarity between the two data segments of the pair, and similarity between data inside each data segment of the pair, wherein the similarity between the two data segments is calculated based on similarities between data units respectively from the two data segments.

3. The apparatus of claim 2, wherein the association estimating device is further configured to:
    weight the similarities between data units each of which is in different one of the two data segments by using lengths of the data units in the two data segments, and calculate a normalized average similarity of the weighted similarities, as the similarity between the two data segments; and
    weight similarities between data units inside each data segment by using lengths of the data units in the data segment, and calculate a normalized average similarity of the weighted similarities, as similarity between data inside the data segment.

4. The apparatus of claim 1, wherein the distance between each pair of data segments is represented by number of data segments between the pair of data segments, or number of data units between the pair of data segments, or a total length of data between the pair of data segments.

5. The apparatus of claim 1, further comprising:
    a scheme selecting device, configured to search for, based on evaluation values of the candidate boundaries obtained by the evaluating device, an optimum segmenting scheme from the one or more candidate segmenting schemes.

6. The apparatus of claim 5, wherein the scheme selecting device is further configured to search for the optimum segmenting scheme by iteratively performing the following dynamic programming steps of:
    searching for one or more candidate preceding boundary sequences corresponding to a candidate boundary sequence segment comprising at least one candidate boundary, wherein a candidate preceding boundary sequence is a boundary sequence comprising at least one candidate boundary which precedes the candidate boundary sequence segment in an order of processing the input data sequence and excluding candidate boundaries which follow the candidate boundary sequence segment in the order of processing the input data sequence, and each candidate boundary in each candidate preceding boundary sequence is determined as valid; and
    selecting, in the one or more candidate preceding boundary sequences, one which has a maximum number of candidate boundaries or one in which a combined evaluation value of candidate boundaries therein is optimum, as the preceding boundary sequence of the candidate boundary sequence segment, this preceding boundary sequence and the candidate boundary sequence segment form a candidate preceding boundary sequence of a following candidate boundary sequence segment to be processed.

7. The apparatus of claim 6, wherein the evaluating device is configured to determine whether a candidate boundary is valid in a corresponding candidate segmenting scheme by:
determining whether the evaluation value of the candidate boundary obtained by the evaluating device meets a predetermined relationship with a threshold, and if yes, determining the candidate boundary is valid.

8. The apparatus of claim 7, wherein in each step of the dynamic programming steps, the threshold used by the evaluating device in determining whether the candidate boundary is valid in the corresponding candidate segmenting scheme is different from those in the other dynamic programming steps; and
wherein the threshold is a random value generated according to statistics of a plurality of training samples.

9. The apparatus of claim 5, wherein the scheme selecting device is further configured to search for the optimum segmenting scheme by using a dynamic programming method based on heuristic search.

10. A method for segmenting an input data sequence, comprising:
searching for one or more candidate boundaries in the input data sequence, in order to obtain one or more candidate segmenting schemes formed by different combinations of these candidate boundaries;
generating, with respect to each candidate segmenting scheme, an evaluation value of each candidate boundary in the candidate segmenting scheme by evaluating a segmenting loss caused by using the candidate boundary in the candidate segmenting scheme to segment the input data sequence, and determining whether the candidate boundary is valid in the candidate segmenting scheme according to the evaluation value the evaluation value reflecting association relationship between a pair of data adjacent segments adjoining to the candidate boundary and association relationship between each of one or more pairs of non-adjacent data segments, each pair of non-adjacent data segments comprising two non-adjacent data segments respectively located at two sides of the candidate boundary, wherein evaluating the segmenting loss as the evaluation value of the candidate boundary includes
estimating the association relationship between the pair of adjacent data segments adjoining to the candidate boundary and the association relationship between each of the one or more pairs of non-adjacent data segments,
weighting the association relationship between each pair of data segments according to a distance between two data segments in the each pair, wherein the larger the distance is, the smaller a corresponding weight is, and
calculating the segment loss according to the weighted association relationships, as the evaluation value of the candidate boundary.

11. The method of claim 10, wherein estimating the association relationship between each pair of data segments comprise:
calculating a similarity between the two data segments of the pair and similarity between data inside each data segment of the pair, wherein the similarity between the two data segments is calculated based on similarities between data units respectively from the two data segments.

12. The method of claim 11, wherein estimating the association relationship between each pair of data segments further comprises:
weighting the similarities between data units each of which is in different one of the two data segments by using lengths of the data units in the two data segments, and calculating a normalized average similarity of the weighted similarities, as the similarity between the two data segments; and
weighting similarities between data units inside each data segment by using lengths of the data units in the data segment, and calculating a normalized average similarity of the weighted similarities, as similarity between data inside the data segment.

13. The method of claim 10, wherein the distance between each pair of data segments is represented by number of data segments between the pair of data segments, or number of data units between the pair of data segments, or a total length of data between the pair of data segments.

14. The method of claim 10, further comprising:
searching for an optimum segmenting scheme from the one or more candidate segmenting schemes based on evaluation values of the candidate boundaries in the one or more candidate segmenting schemes.

15. The method of claim 14, wherein searching for the optimum segmenting scheme comprises iteratively performing the following dynamic programming steps of:
searching for one or more candidate preceding boundary sequences corresponding to a candidate boundary sequence segment comprising at least one candidate boundary, wherein a candidate preceding boundary sequence is a boundary sequence comprising at least one candidate boundary which precedes the candidate boundary sequence segment in an order of processing the input data sequence and excluding candidate boundaries which follow the candidate boundary sequence segment in the order of processing the input data sequence, and each candidate boundary in each candidate preceding boundary sequence is determined as valid; and
selecting, in the one or more candidate preceding boundary sequences, one which has a maximum number of candidate boundaries or one in which a combined evaluation value of candidate boundaries therein is optimum, as the preceding boundary sequence of the candidate boundary sequence segment, this preceding boundary sequence and the candidate boundary sequence segment form a candidate preceding boundary sequence of a following candidate boundary sequence segment to be processed.

16. The method of claim 15, wherein determining whether a candidate boundary is valid in a corresponding candidate segmenting scheme comprises:
determining whether the evaluation value of the candidate boundary meets a predetermined relationship with a threshold, and if yes, determining the candidate boundary is valid.

17. A non-transitory computer program product, comprising program code which, when loaded into a memory of a computer and executed by a processor of the computer, cause the processor to perform steps:
searching for one or more candidate boundaries in the input data sequence, in order to obtain one or more candidate segmenting schemes formed by different combinations of these candidate boundaries
generating, with respect to each candidate segmenting scheme, an evaluation value of each candidate boundary in the candidate segmenting scheme by evaluating a segmenting loss caused by using the candidate boundary in the candidate segmenting scheme to segment the input data sequence, and determining whether the candidate boundary is valid in the candidate segmenting scheme according to the evaluation value the evaluation value reflecting association relationship between a pair of data adjacent segments adjoining to the candidate boundary and association relationship between each of one or more pairs of non-adjacent data segments, each pair of non-adjacent data segments comprising two non-adjacent data segments respectively located at two sides of the candidate boundary, wherein evaluating the segmenting loss as the evaluation value of the candidate boundary includes estimating the association relationship between the pair of adjacent data segments adjoining to the candidate boundary and the association relationship between each of the one or more pairs of non-adjacent data segments, weighting the association relationship between each pair of data segments according to a distance between two data segments in the each pair, wherein the larger the distance is, the smaller a corresponding weight is, and calculating the segment loss according to the weighted association relationships, as the evaluation value of the candidate boundary.

18. A computer implemented data segmenting apparatus, comprising:

an input device, configured to receive an input data sequence; and a processing device, coupled to the input device and comprising:

a boundary searching device, configured to search for one or more candidate boundaries in the input data sequence, in order to obtain one or more candidate segmenting schemes formed by different combinations of these candidate boundaries; and an evaluating device, configured to, with respect to each candidate segmenting schemes, generate an evaluation value of each candidate boundary in the candidate segmenting scheme by evaluating a segmenting loss caused by using the candidate boundary in the candidate segmenting scheme to segment the input data sequence, and determine whether the candidate boundary is valid in the candidate segmenting scheme according to the evaluation value, the evaluation value reflecting association relationship between a pair of adjacent data segments adjoining to the candidate boundary and association relationship between each of one or more pairs of non-adjacent data segments, each pair of non-adjacent data segments comprising two non-adjacent data segments respectively located at two sides of the candidate boundary, wherein the evaluating device includes an association estimating device, configured to estimate the association relationship between the pair of adjacent data segments adjoining to the candidate boundary and the association relationship between each of the one or more pairs of non-adjacent data segments, a loss calculating device, configured to weight the association relationship between each pair of data segments according to a distance between two data segments in the each pair, and calculate the segment loss according to the weighted association relationships, as the evaluation value of the candidate boundary, wherein the larger the distance is, the smaller a corresponding weight is and a validity judging device, configured to determine, according to the evaluation value, validity of the candidate boundary in corresponding candidate segmenting scheme.

* * * * *